Feb. 20, 1968   R. R. SIDERS ET AL   3,369,746
STORING DATA
Filed May 24, 1966   5 Sheets-Sheet 4

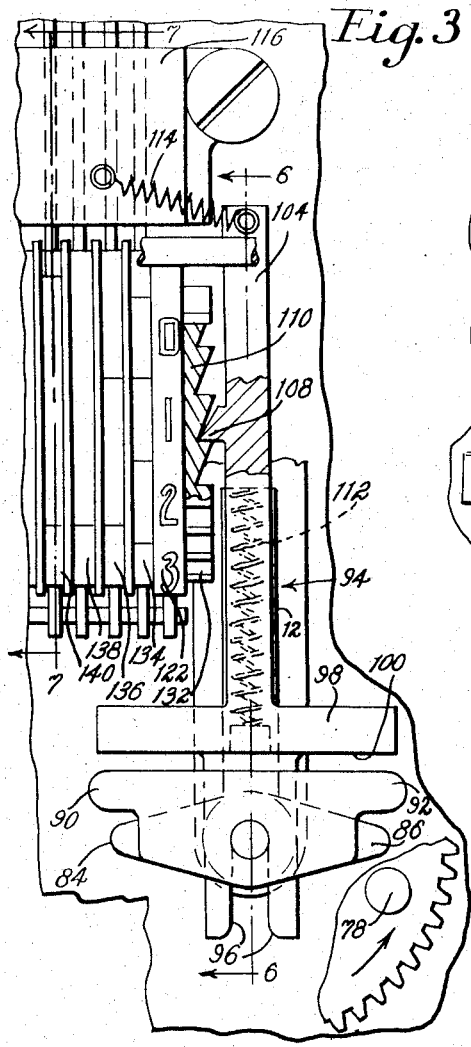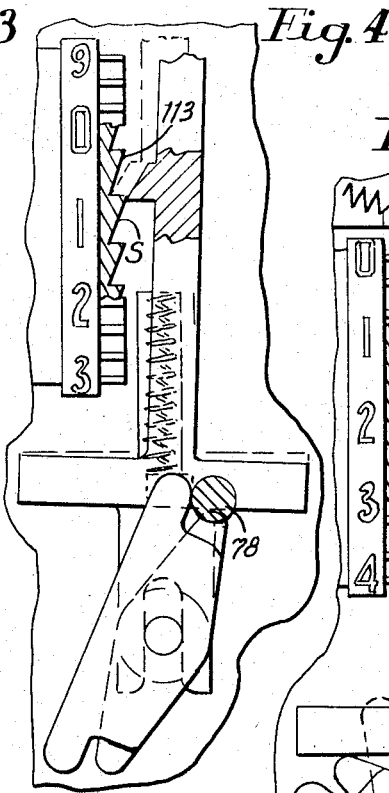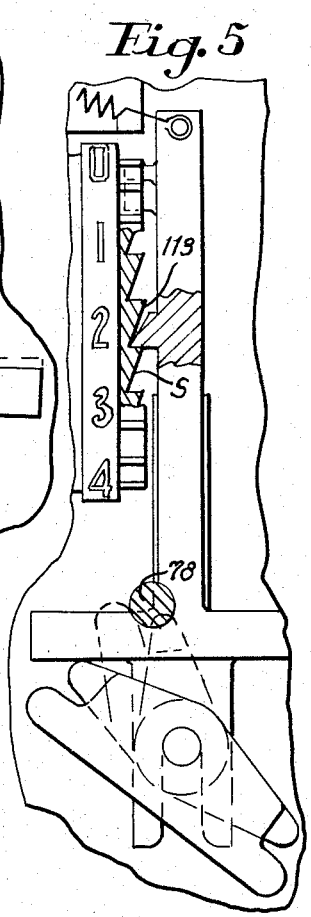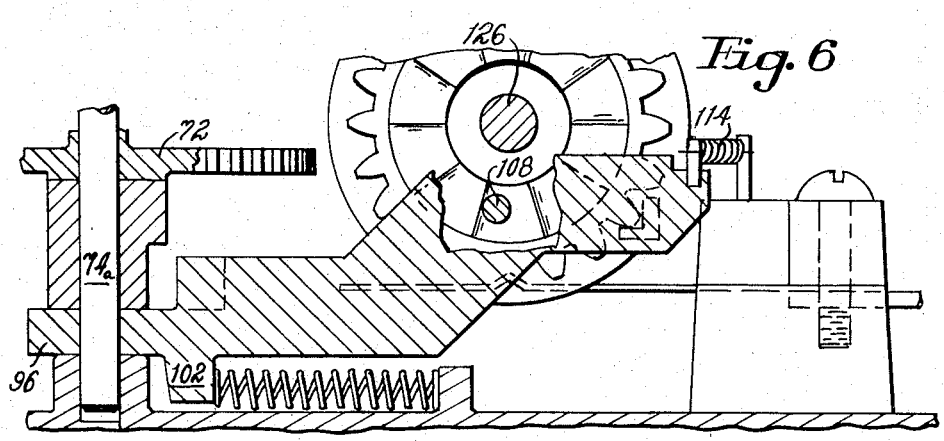

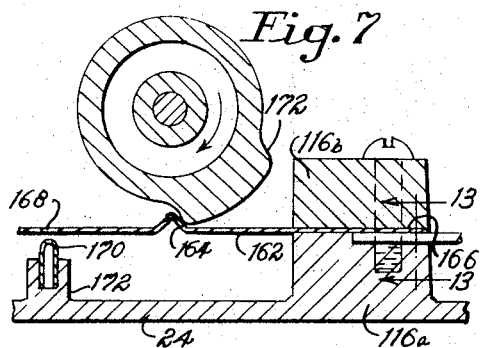
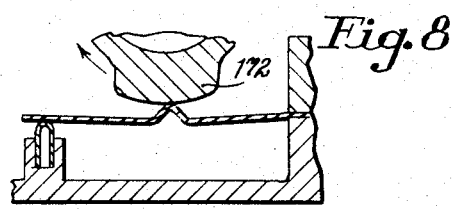
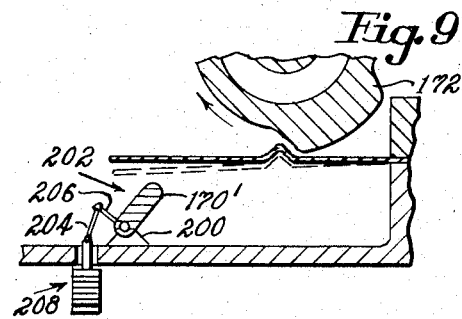
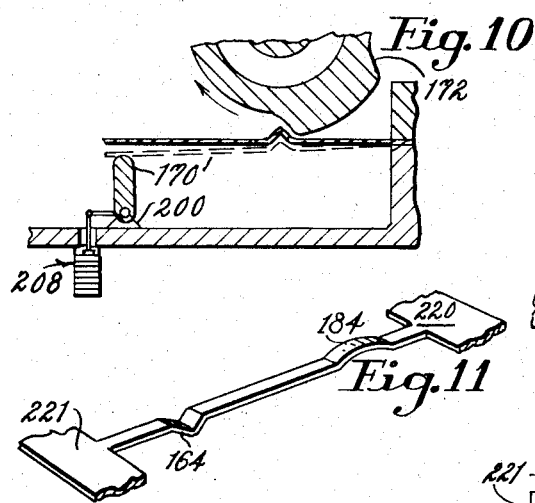
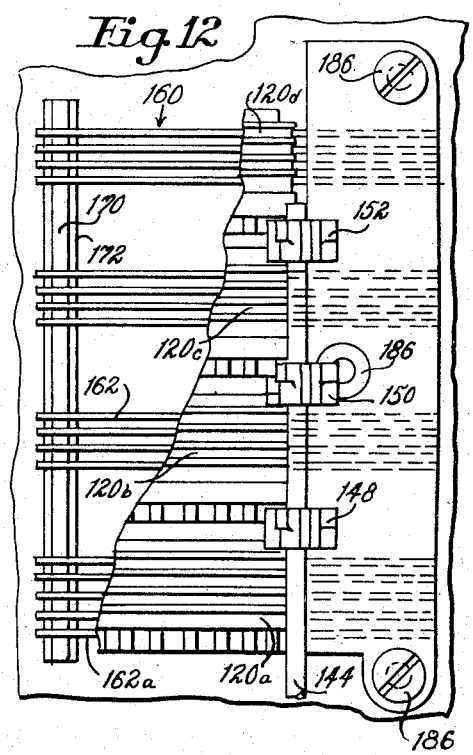
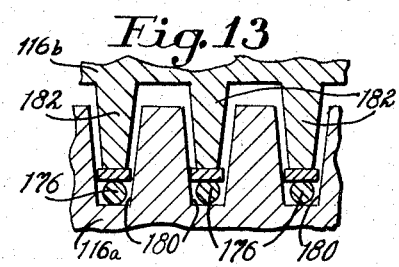
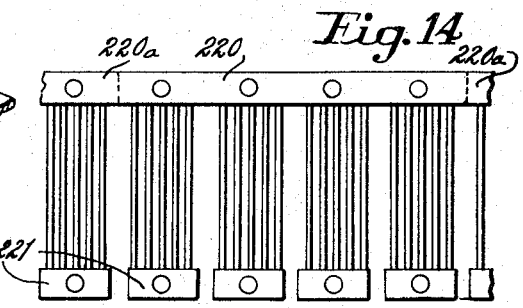

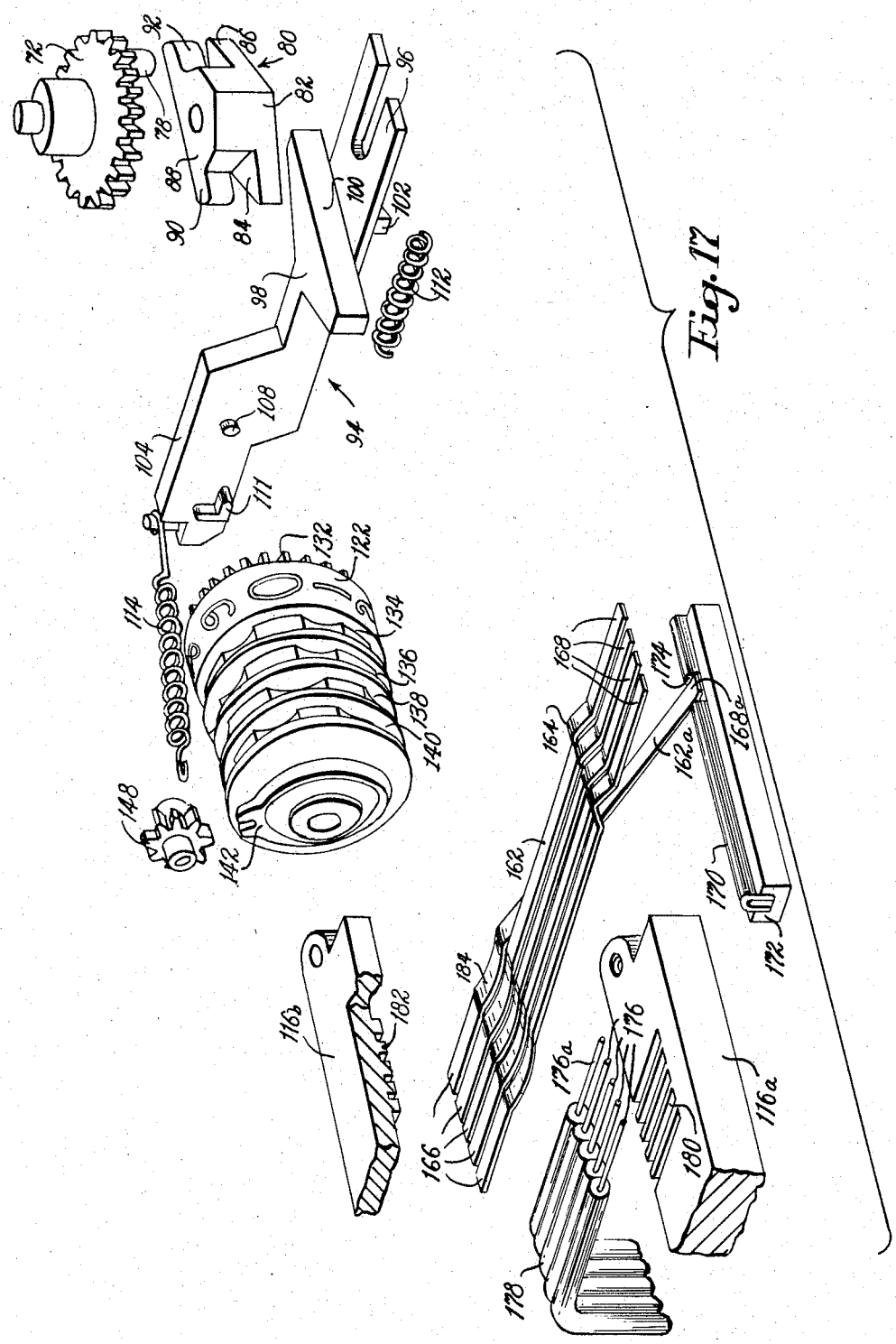

United States Patent Office 3,369,746
Patented Feb. 20, 1968

---

3,369,746
STORING DATA
Robert Raymond Siders, Medfield, and Roger Williams Hood, North Attleboro, Mass., assignors to Hersey-Sparling Meter Company, Dedham, Mass., a corporation of Massachusetts
Filed May 24, 1966, Ser. No. 552,602
12 Claims. (Cl. 235—94)

ABSTRACT OF THE DISCLOSURE

Totalizing apparatus having an element movable in response to the condition being measured, a storage unit responsive to the element, and switches mechanically actuated by the storage unit to reflect the positions of the storage unit.

---

This invention relates to electrical readout of totalizing apparatus (e.g., water meters). The invention is especially useful in conjunction with apparatus disclosed in the commonly assigned U.S. patent application filed the same day as the present application by Robert Raymond Siders and by Roger Williams Hood and Robert Raymond Siders, Ser. No. 552,603, entitled Portable Recording, and Ser. No. 552,605, entitled Electrically Connecting and Disconnecting.

It is a primary object of the invention to provide totalizing apparatus in which the totals are stored mechanically and converged for electrical readout with minimum friction. Further objects are to provide such apparatus which is simple, reliable, easily assembled, and of low cost construction.

In general, the invention features an element mounted for mechanical movement responsive to a quantitatively notatable condition and at a rate proportional to the current rate of the condition, a storage unit mounted for mechanical movement by the element to positions proportional to the time integral of the rate, and electrical circuitry including at least one switch operatively mechanically actuated by a portion of the storage unit to provide a condition reflective of the positions, the circuit portion including the switch being free of any other electrical connection dependent on any operative mechanical relationship with a moving portion of the storage unit. In preferred embodiments the switch is out of operative mechanical relationship with the actuating portion of the storage unit in some of the positions of the unit; the storage unit is a plurality of wheels each providing a plurality of associated cams arranged in circumferential cam tracks; the switches include a series of resilient brushes supported adjacent the cam tracks and spaced above a preferably U-shaped common contact rail, the brushes being out of contact with the wheels and the rail except when a cam is in position to close its corresponding switch by pressing the brush, preferably in a wiping movement, against the rail; the storage unit wheels include circumferentially numbered portions for visual readout; and multiple wire electrical circuitry, connected with one wire in electrical contact with each brush and a common wire in electrical contact with the rail through a stationary brush, carries the electrical representation of the stored total.

Other objects, features, and advantages will appear from the following description of a preferred embodiment of the invention, taken together with the attached drawings thereof, in which:

FIG. 3 is a plan view partially broken away and partially in section of the indexing portion of the totalizing apparatus;

FIG. 4 is a view similar to FIG. 3 showing a different position of the indexing mechanism;

FIG. 5 is a view similar to FIG. 3 showing yet another position of the indexing mechanism;

FIG. 6 is a section along 6—6 of FIG. 3;

FIG. 7 is a vertical section through a number wheel and switch assembly;

FIG. 8 is a view similar to FIG. 7 showing the wheel in a different position;

FIG. 9 is a view similar to FIG. 7 showing another embodiment of the invention;

FIG. 10 is a view similar to FIG. 9 showing another position of the wheel and contact rail in that embodiment;

FIG. 11 is a perspective view of a switch brush;

FIG. 12 is a plan view of the number disk and brush assemblies with the wheels partially broken away to reveal the brushes;

FIG. 13 is a vertical section through the clamp holding the brushes and wires in contact;

FIG. 14 is a plan view of a portion of a strip of brushes held by carrier strips;

FIG. 17 is an exploded view of a portion of the totalizing apparatus.

Figure 1:
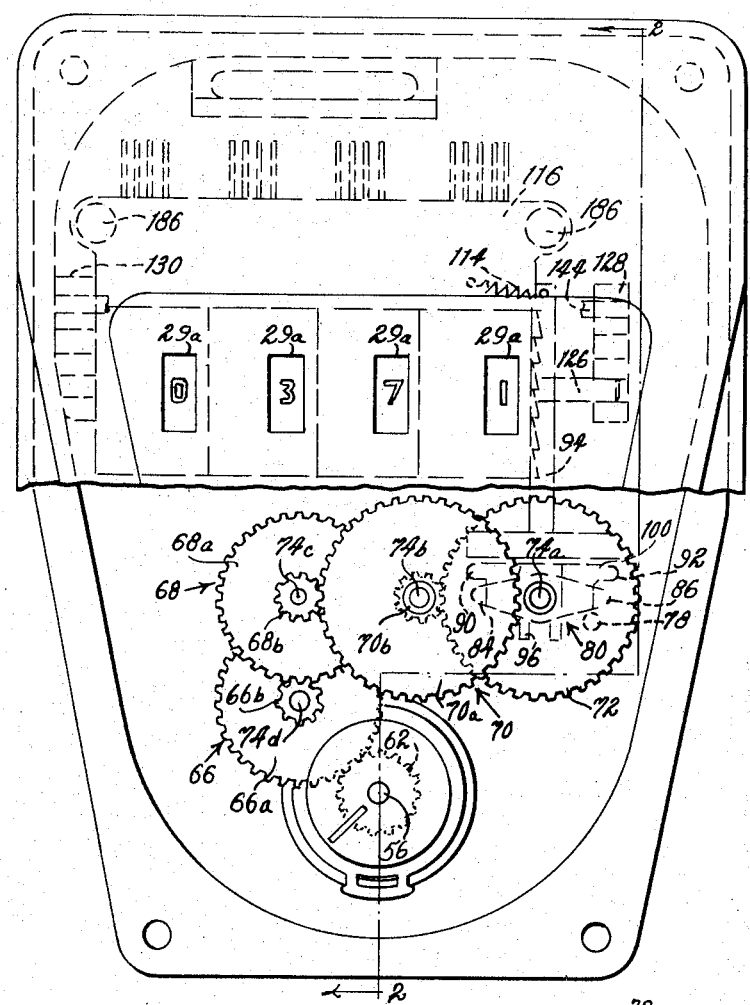
FIG. 1 is a plan view partially broken away of a portion of the totalizing apparatus.
Figure 2:
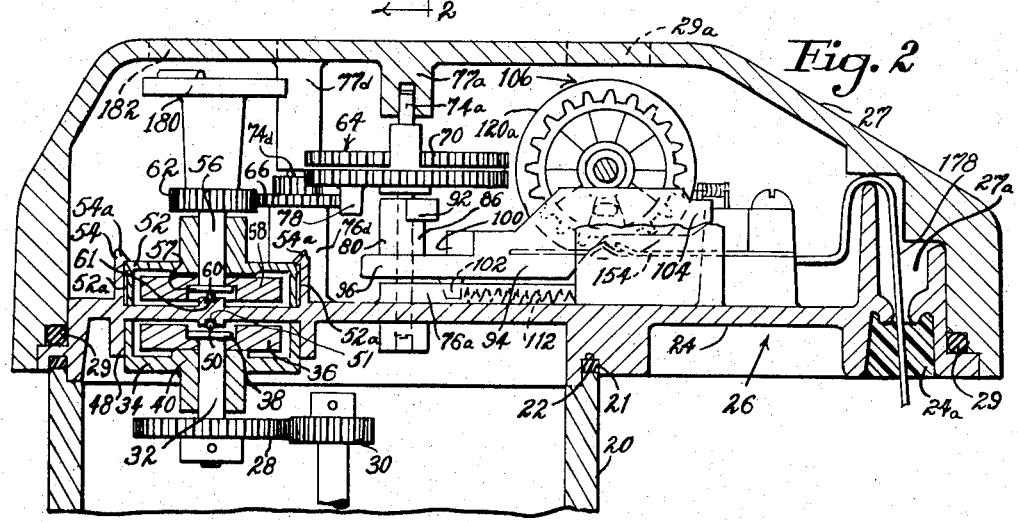
FIG. 2 is a section along 2—2 of FIG. 1.

Referring to the drawings, register 26 is sealingly mounted on a standard water meter with cylindrical meter wall 20 against rubber O-ring 21 in groove 22 in base plate 24 (of a thermoplastic sold by General Electric Co. as Lexan) of the register. Cover 27 (of Lexan) is bolted to plate 24, the cover and plate being sealed by rubber O-ring 29. Change gear 28, driven by meter output gear 30, is mounted on lower drive spindle 32 in turn journaled in lower magnetic drive spindle bearing 34. Circular face magnetized 4-pole ceramic magnet 36 is mounted at the end of spindle 32 for rotation with spindle head 38 above and spaced from raised portion 40. Bearing 34 is snapped into cylindrical extension 48 of plate 24, bring spindle head 38 into bearing registry with steel ball bearing 50 snapped into recess 51 at the underside of plate 24. Identical components are arranged, symmetrically, on the above side of plate 24 including upper magnetic drive bearing 52 snapped into cylindrical plate extension 54, spindle 56 with head 57, magnet 58 and ball bearing 60 in recess 61. Hooks 54a of extension 54 ride up vertical tracks 52a to snap over bearing 52. (Corresponding hooks and tracks in extension 48 and bearing 34 do not appear, because angularly spaced from those shown.)

Drive pinion 62 fixed on spindle 56 drives gear train 64 having gear units 66, 68, each having a 40 tooth gear 66a, 68a, and a pinion 66b, 68b; gear unit 70 having 50 tooth gear 70a, and pinion 70b; and 50 tooth drive gear 72; each supported for rotation on a spindle 74a–d, extending between appropriately elongated gear unit positioning lugs 76a–d, 77a–d on plate 24 and cover 27.

Cylindrical lug 78 depends from drive gear 72 adjacent its periphery (see especially FIG. 17). Index actuator 80 is supported for rotation on the same spindle 74a as and beneath gear 72, and includes a generally diamond shaped lower portion 82 with rounded lobes 84, 86 and a somewhat longer and wider upper portion 88 with lobes 90, 92. Actuating arm 94 has a slotted alignment leg 96 that straddles spindle 74a, and a camming portion 98 providing above leg 96 a smooth vertical cam surface 100 of a length equal to that of actuator portion 88. Arm 94 further includes indexing extension 104 extending forwardly toward number disc assembly wheel 120a, with obliquely faced indexing lug 108 protruding to the side to engage face gear 110 (FIG. 3) of wheel 120a. Compression spring 112 is disposed parallel to and beneath arm 94 in elongated recess 114 in elongated lug 76a with its ends respectively between the forward inner end of lug 76a and arm 94 at lug 102, biasing arm 94 toward spindle 74a. Actuator arm spring 114 is secured at its ends respectively to the forward end of extension 104 and to stationary clamp 116 to bias indexing extension 104 toward wheel 120a, maintaining indexing lug 108 in firm registry with the teeth of face gear 110. L-shaped lug 111 extends from the side near the forward end of extension 104 and acts to prevent override of the number disc assembly during the indexing sequence.

Number disc assembly 106 has four identical wheels 120a–d (FIG. 11) supported for rotation on shaft 126 journaled in end supports 128, 130, each having a number disc 122 bearing numerals zero through nine, a circular gear 132 at the right hand (in FIG. 3) end of the wheel, four cam track segments 134, 136, 138, 140 to the left of the disc 122, and a two-toothed circular gear 142 at the left end of the wheel. Wheel 120a provides face gear 110 on its right hand face. Similar face gears on the other three wheels perform no function. Shaft 144, journaled in end supports 128, 130 above and rearwardly of shaft 126, carries four freely rotatable mutilated pinion gears 146, 148, 150, 152, each pinion gear having every other tooth cut away at its right by a fraction of its width and being located to register with gears 132 and 142 to decimally relate the four number discs in standard mechanical fashion. Spring clip 154, mounted on clamp 116, engages pinion gear 146 to prevent any possible rearward rotation of the number disc assembly owing to friction between lug 108 and face gear 110.

Brush assembly 160 is disposed beneath number disc assembly 106 with one brush 162 under each of the sixteen cam tracks 134–140 and a seventeenth brush 162a, serving as a common, under the right hand number disc. Each brush 162 is a thin resilient strip with a raised bend 164 directly under its respective cam track. The brushes are supported at their rearward ends 166 in clamp 116 and are at their free forward ends 168 (gold plated at their contact areas) spaced above inverted U-shaped copper contact strip 170 (gold plated at its contact area) mounted in ridge 172 of base plate 24. Brush 162a is bent downwardly at its free end 168 to permanently engage strip 170 in a force fit in slot 174. The seventeen stripped wire ends 176, 176a of ribbon cable 178 enter clamp 116 from the rear. Each brush and wire pair is located with the wire end 176 under the brush end 166 in a wedge shaped groove 180 in lower clamp portion 116a (integral with plate 24) and is compressed to form a secure electrically conductive joint by wedge shaped projection 182 from upper clamp portion 116b (a separate strip of thermoplastic sold as Celcon by Celanese Corporation) pressed into groove 180. To ensure continued firm spring contact, brush end 166 is bellied downwardly at 184 in manufacture before mounting. Bolts 186 hold together the upper and lower clamp portions.

Each cam track 134–140 provides a series of circumferentially spaced cams protruding sufficiently to contact the respective brushes 162 at bends 164 upon approaching a position at the bottom of the wheel 106 and press the brushes individually into contact with rail 170, the wheels otherwise being out of contact with the brushes.

Figure 16:
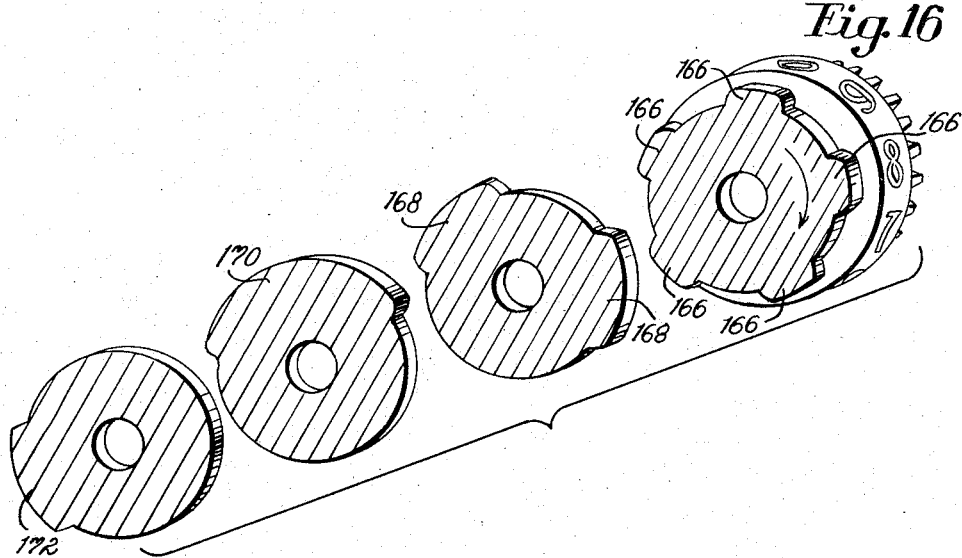
FIG. 16 is an exploded view of a number wheel.

The cams and brushes are arranged to convert the decimal mechanical registration of the four wheels 106 into binary electrical registration in terms of the 4-bit 8–4–2–1 binary code. Considering the ten stepped angular positions of each wheel corresponding to the ten digital readings on the number disc, track 134 has five equally spaced cams 166 (FIG. 16) arranged to depress the corresponding brush at digital wheel positions 1, 3, 5, 7, and 9, track 136 has two cams 168 approximately twice the length of cam 166 arranged to depress the corresponding brush at wheel positions 2, 3, 6, and 7, track 138 has a single cam 170 approximately four times the length of cam 166 arranged to depress the corresponding brush at wheel positions 4, 5, 6, and 7, and track 140 has a single cam 172 approximately the length of cam 168 and arranged to depress the corresponding brush at wheel positions 8 and 9. The resulting different combinations of the positions of the four brushes under each wheel thus provide unique binary coded electrical representations of the successive digital positions of the wheel. Cover 27 is molded with surface texture leaving four windows 29 above the number disc to enable visual reading of the wheel positions.

Indicator wheel 180 is mounted on spindle 56 and is observable through window 182 in cover 27 particularly for testing purposes.

In operation, gear 30 drives change gear 28 at an angular velocity proportional to the flow through the meter. velocity is stepped down through the gear train 64, producing a relatively slow rotation of lug 78. Because of the novel quick-change assembly for input to the first wheel 120a, the rotation may be in either direction. Eventually, lug 78 contacts lobe 90 or 92 of actuator 80 and rotates the actuator (in either direction) to bring one of lobes 84, 86 against cam surface 100, gradually driving arm 94 forward against spring 112 and simultaneously moving extension 104 rightwardly against spring 114 as lug 108 rides up on a slope 111 of face gear 110 (FIG. 4). As actuator 80 continues its rotation lug 108 snaps into engagement with the next slope 113 of gear 110 (FIG. 5) and, as lobe 84 or 86 moves past the center of surface 100, spring 112 forces arm 94 rapidly toward spindle 74a, lobe 84 or 86 being advanced one digital position. Lug 111 engages two teeth of gear 132 of wheel 120a to prevent the wheel from advancing more than a single digital position, without undue wear. The rotation of lug 78 continues and eventually the other of lobes 84, 86 causes a unit advance of wheel 120a. In this manner, wheel 120a advances one unit for each 180° rotation of gear 72 (a 200:1 velocity reduction relative to gear 28, which can be increased to 400:1 by removing one of lobes 84, 86), with the actual movement of wheel 120 occurring during a very small increment of time, to minimize errors through reading while in transition. Wheels 120b, c and d are turned appropriately through mutilated pinions 148 to provide a visual decimal representation of the metered flow at the same time. Thus, e.g., as wheel 120a moves between its digital positions nine and zero, its gear 142 engages pinion 148 which in turn is engaged with gear 132 of wheel 120b, thereby temporarily coupling wheels 120a and 120b and moving wheel 120b one digital position. Cams 166, 168, 170, 172 control the positions of brushes 162 to selectively connect them through rail 170 to common brush 162a. By closing, at the other end of cable 178, the circuit between common wire 176a and each of the 16 other wires 176, and introducing electrical power into the system, it is thus possible to read out a binary representation of the register position.

The cams 166–172 are arranged to depress brushes 162 farther than is necessary to contact rail 170 (FIG. 8), producing a wiping of the brush against the rail and hence a good contact. Torque on the number disc assembly is minimized by the fact that the wheels do not ride against the brushes when no rail contact is to be made, and do not ride against common brush 162a at all.

An embodiment shown in FIGS. 9, 10 further reduces torque on the number disc assembly by eliminating brush to rail contact except when a remote readout is being made. Rail 170′ is pivotally mounted on bracket 26 and connected through linkage 202, including pivoted arms 204, 206, to the piston of solenoid 208 secured to the underside of plate 24. When the solenoid is not actuated rail 170' is tilted forward out of the way of even the cam-depressed brushes. Upon actuation of the solenoid when electrical readout is desired, rail 170' is pulled upright into contact with those brushes currently depressed.

Figure 15:
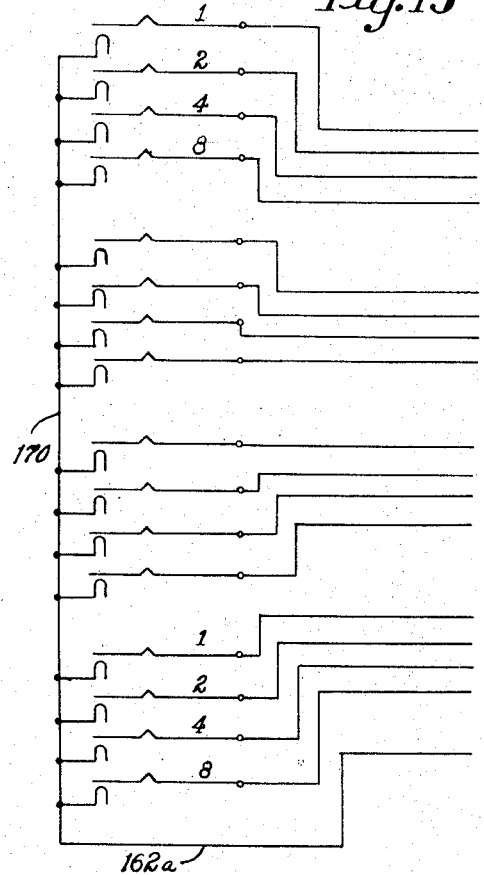
FIG. 15 is a schematic wiring diagram of another embodiment.
Figure 15A:
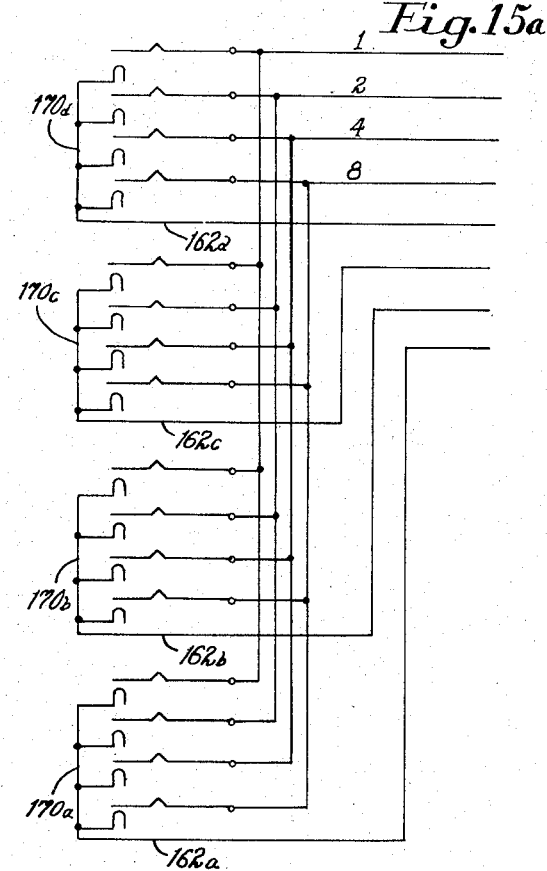
FIG. 15(a) is a schematic wiring diagram of a further embodiment.

In a further embodiment, shown in FIG. 15a, a separate common is provided for each wheel by splitting rail 170 into segments 170a–d (shown schematically in FIG. 15a) and using a common brush 162a–d for each wheel. The brushes in the four tracks 134 are wired in parallel, as are those respectively in tracks 136, 138, 140. The electrical registration may thus be transmitted over 8 wires rather than 17.

Brush assembly 160 is manufactured in long strips of brushes in recurring appropriately spaced groups of 5 brushes supported between continuous carrier strip 220, and carrier strips 121 each joining a group of 5 brushes. Strip 220 is then broken along perforations 220a to provide groups of 20 brushes. Wires 176, 176a are placed in grooves 180 in clamp 116 and the brushes are placed thereabove. Clamp portions 116a, 116b are brought tightly together with self tapping screws. The carrier strips and the unused fifth brushes under wheels 120b–d are broken away. Rail 170 is pressed into plate 24 and common brush 168a is pressed into slot 174 and held there by friction. Solderless electrical assembly is thus provided.

Other embodiments will occur to those skilled in the art and are within the following claims.

What is claimed is:

1. Totalizing apparatus which comprises
   an element mounted for mechanical movement responsive to a quantitatively notatable condition and at a rate proportional to the current rate of said condition,
   a storage unit mounted for mechanical movement by said element to positions proportional to the time integral of said rate,
   and electrical circuitry including a multiplicity of switches each operatively mechanically actuated by a portion of said storage unit to provide a condition reflective of said positions,
   said switches being free of any other electrical connection dependent on any operative mechanical relationship with a moving portion of said storage unit,
   said switches being out of operative mechaniscal relationship with said portion in some of said positions.

2. The apparatus of claim 1 wherein said storage unit includes a wheel mounted for rotation and said portion is a cam surface disposed on the periphery of said wheel, said switch being out of operative mechanical relationship with said wheel except when actuated by said cam surface.

3. The apparatus of claim 1 wherein said storage unit includes a wheel mounted for rotation and said wheel provides a multiplicity of cam surfaces arranged in four circumferential cam tracks, and four said switches are arranged for respective operative mechanical actuation by said cam surfaces to provide a condition in said four switches reflective of the rotary position of said wheel.

4. The apparatus of claim 3 wherein said wheel includes a circumferentially numbered portion for visual readout.

5. The apparatus of claim 1 wherein said switch comprises a stationary electrically conductive member and a resilient electrically conductive brush that is normally positioned out of electrical contact with said stationary member but from time to time is operatively mechanically actuated by said storage unit portion to engage said stationary member.

6. The apparatus of claim 5 wherein said brush is unsupported at one end and, when actuated by said storage unit portion, is flexed in the direction of said stationary member a distance greater than the spacing between said brush and said member when said brush is normally positioned, whereby a wiping of said brush against said member is produced.

7. The apparatus of claim 5 wherein said brush when operatively mechanically actuated is mechanically engaged, and said brush is crimped to provide a portion protruding in the direction of said storage unit portion at the point of said engagement.

8. The apparatus of claim 1 wherein all of said switches include and share a single stationary U-shaped electrically conductive member, and said apparatus further includes a multiplicity of wires one of which is in permanent electrical communication with said U-shaped member, the others of which are respectively each in permanent electrical communication with one of said switches.

9. The apparatus of claim 8 wherein said one wire is electrically connected to said U-shaped member through a resilient brush one end of which is force fitted into a slot in said U-shaped member.

10. The apparatus of claim 1 wherein said switch includes a first member operatively mechanically alternated by said storage unit portion between actuating and deactuating positions, and a second member selectively movable between actuating and deactuating positions, said switch being open with said members out of physical and electrical contact with each other except when both said members are in said actuating positions.

11. The apparatus of claim 1 wherein each said switch has a first and second member, said storage unit has a plurality of sub-units, each having a plurality of said switches associated therewith, said apparatus further including circuitry connecting in parallel corresponding switches of each of said sub-units and providing separate wiring to each of said second members and each paralleled group of first members, said second members being electrically isolated from each other.

12. The apparatus of claim 1 wherein said storage unit includes a plurality of decimally related wheels mounted for rotation, each wheel having an integral segment providing a multiplicity of cam surfaces arranged in four circumferential cam tracks, each wheel having four said switches associated therewith,
   said switches include a common stationary electrically conductive U-shaped rail and individual resilient electrically conductive brushes each supported by one end adjacent one of said cam tracks normally out of contact with both said wheel and said rail but from time to time contacted by one of said cams in said adjacent track and flexed thereby into wiping contact with said rail, and
   a resilient brush identical with the first mentioned brushes of said switches is mounted at one end and retained at its free end in a slot in said rail.

References Cited

UNITED STATES PATENTS

| | | | |
|---|---|---|---|
| 2,559,723 | 7/1951 | Litrell | 235—117 |
| 2,775,403 | 12/1956 | Hall et al. | 235—79 |
| 2,841,335 | 7/1958 | Sengbusch | 235—128 |
| 3,313,481 | 4/1967 | Kondur et al. | 235—61 |

RICHARD B. WILKINSON, *Primary Examiner.*

S. A. WALL, *Assistant Examiner.*